(12) United States Patent
Grehant et al.

(10) Patent No.: US 8,604,736 B2
(45) Date of Patent: Dec. 10, 2013

(54) METHOD FOR ANALYZING THE OPERATION OF AN ELECTROMECHANICAL ACTUATOR FOR THE MOTORIZED MANEUVERING OF A SCREEN AND ACTUATOR FOR ITS IMPLEMENTATION

(75) Inventors: Bernard Grehant, Nancy-sur-Cluses (FR); Alain Tranchand, La Balme de Sillingy (FR); Geoffroy Dumont D'ayot, Seynod (FR)

(73) Assignee: Somfy SAS, Cluses (FR)

( * ) Notice: Subject to any disclaimer, the term of this patent is extended or adjusted under 35 U.S.C. 154(b) by 574 days.

(21) Appl. No.: 12/738,149

(22) PCT Filed: Oct. 16, 2008

(86) PCT No.: PCT/IB2008/054250
§ 371 (c)(1),
(2), (4) Date: Apr. 15, 2010

(87) PCT Pub. No.: WO2009/050664
PCT Pub. Date: Apr. 23, 2009

(65) Prior Publication Data
US 2010/0231156 A1    Sep. 16, 2010

(30) Foreign Application Priority Data

Oct. 16, 2007 (FR) .................................. 07 07237

(51) Int. Cl.
*H02P 3/00* (2006.01)
*G05B 19/10* (2006.01)

(52) U.S. Cl.
USPC ........... 318/466; 318/280; 318/467; 318/468; 318/567

(58) Field of Classification Search
USPC .......................... 318/280, 466, 467, 468, 567
See application file for complete search history.

(56) References Cited

U.S. PATENT DOCUMENTS

| | | | |
|---|---|---|---|
| 6,741,052 B2 | 5/2004 | Fitzgibbon | |
| 6,870,334 B2 | 3/2005 | Jurado et al. | |
| 6,940,240 B2 | 9/2005 | Kelkhoff et al. | |
| 7,129,662 B2 * | 10/2006 | D'ayot | 318/468 |
| 7,530,702 B2 * | 5/2009 | Luettgen et al. | 362/23 |

(Continued)

FOREIGN PATENT DOCUMENTS

| | | |
|---|---|---|
| EP | 0 976 909 A | 2/2000 |
| EP | 1 530 284 A | 5/2005 |

(Continued)

*Primary Examiner* — Lincoln Donovan
*Assistant Examiner* — Gabriel Agared
(74) *Attorney, Agent, or Firm* — Frommer Lawrence & Haug LLP; Ronald R. Santucci

(57) ABSTRACT

Method of operating an actuator (1) for maneuvering a movable element (52), comprising a motor of asynchronous type or of brushless type or comprising a motor associated with a differential brake, and comprising a partially irreversible reduction gear, which comprises a step of establishing a measurement of an operating parameter of the actuator and a step of using this measurement to determine whether the actuator is driving the movable element or whether the actuator is being driven by the movable element, and then a step of implementing first logic for determining an end of travel or an obstacle, or a step of implementing second logic for determining an end of travel or an obstacle, depending on whether the actuator drives the movable element or the actuator is driven by the movable element.

15 Claims, 2 Drawing Sheets

(56) References Cited

U.S. PATENT DOCUMENTS

| | | | |
|---|---|---|---|
| 7,785,247 B2* | 8/2010 | Tatum et al. | 600/16 |
| 8,026,902 B2* | 9/2011 | Medler et al. | 345/173 |
| 8,080,962 B2* | 12/2011 | Cooper et al. | 318/472 |
| 2006/0033460 A1* | 2/2006 | D'ayot | 318/280 |

FOREIGN PATENT DOCUMENTS

| | | |
|---|---|---|
| FR | 2 770 699 A | 5/1999 |
| FR | 2 849 300 A | 6/2004 |
| FR | 2 898 994 A | 9/2007 |
| WO | WO 2007/107864 A | 9/2007 |

* cited by examiner

METHOD FOR ANALYZING THE OPERATION OF AN ELECTROMECHANICAL ACTUATOR FOR THE MOTORIZED MANEUVERING OF A SCREEN AND ACTUATOR FOR ITS IMPLEMENTATION

This application is a 371 of PCT/IB2008/054250 filed on Oct. 16, 2008, published on Apr. 23, 2009 under publication number WO 2009/050664 A which claims priority benefits from French Patent Application Number 07 07237 filed Oct. 16, 2007, the disclosure of which is incorporated herein by reference.

BACKGROUND OF THE INVENTION

The invention relates to an actuator comprising an electric motor used to maneuver a movable element for closure, shading, solar protection or a screen in a building. The invention is particularly useful when one wishes to measure, on the basis of the behavior of the motor, the actions on a movable element subject to the effects of gravitation, for example the movable element being displaced between a bottommost position and a topmost position caused by rotational movements of the motor.

Some actuators intended to be installed in buildings and intended for maneuvering elements for closure, shading, solar protection or a screen (such as for example roller blinds, doors, gates or shutters) comprise a monophase induction motor (or asynchronous motor) with permanent capacitor. The invention is also applicable to actuators comprising an induction motor of three-phase type, or else to actuators comprising a commutator-type or brushless (BLDC) DC motor.

A reduction gear is associated with the motor in the actuator. This reduction gear is partially irreversible; that is to say it has a different efficiency depending on whether it is the input shaft which drives the output shaft or whether it is the output shaft which drives the input shaft, the efficiency generally being lower when it is the output shaft which drives the input shaft.

These actuators are powered from the AC network, for example 230 V 50 Hz, or from a DC source.

They are fitted with an immobilization brake ensuring the disabling of the actuator when the motor is not powered. The role of the brake is essential, in particular in regard to safety. It must be activated by default, and oppose the driving torque caused by gravity on the movable element, this torque itself being able to vary according to the position of the movable element, in particular if the latter is windable, for example a roller blind.

The brake is often deactivated by the magnetic flux of the stator of the motor when it is an induction motor, but it is known to use other types of brakes: electro-brake, hysteresis brake, centrifugal brake, ramp brake etc. The use of such ramp brakes, also called "differential brakes" or "torque transmission brakes", is particularly beneficial in replacing electro-brakes, brakes activated by the stator flux or hysteresis brakes. These differential brakes have been especially studied by the Applicant in order to prevent the action of the brake from significantly masking the indirect measurement of the torque produced by the load on the actuator when in fact the torque provided by the motor is measured.

However, whatever type of brake is used, a problem exists resulting from the partial irreversibility of the reduction gear: for a given variation in the load torque at the actuator output level, the variation in motor torque is different depending on whether the actuator is operating in driven-load or in driving-load mode.

Now, as has been noted in the prior art, operation in driven-load or in driving-load mode does not depend simply on the direction of rotation of the motor. In the case of a roller blind or similar, ordered to close from a fully wound position, the motor must first of all produce a motor torque to push the slats as unwinding begins, and then it produces a resistive torque (the motor then operating as generator) when the unwound mass is sufficient for its weight to exceed the action of the mechanical friction. Likewise, in the case of a tilting garage door where it is necessary firstly to push over the mainly horizontal part of the trajectory, and then to hold back over the mainly vertical part of this trajectory.

When using a differential brake the situation is worse still, since the motor always operates as motor, whether the load is driving or driven: how then to identify the state of the load?

Even without a differential brake being used, the identification of a driving-load or driven-load situation poses a problem if one is not dealing with using solely a DC motor with magnets and commutator which allows this identification by simply measuring the direction of the current.

In the case where a reduction gear is present, and the lower its efficiency (for example less than 80%), the losses in the reduction gear suffice to prevent to get such a fine detection: it is in fact necessary that the load is not only driving but moreover that it provides a power greater than the losses in the reduction gear to cause the direction of the current to reverse. This effect is all the more marked the more the reduction gear exhibits an irreversible character, that is to say poor efficiency when it is driven by the load.

When using an electronic commutation motor (ECM), for example a motor of brushless type (BLDC), the losses in the power supply device are also such that it is well beyond the switchover to a driving-load situation that this results in a reverse transfer of power and in the need to dissipate this power at the level of the motor.

DESCRIPTION OF THE PRIOR ART

Numerous prior art devices make provision to modify the torque provided by a motor or to modify the detection sensitivity of an obstacle detection device as a function of the position of the movable element over its trajectory, as in patent U.S. Pat. No. 6,741,052. This compels adjustments by the installer, hence a loss of time, without however guaranteeing that this adjustment is optimal. Other documents make provision for the detection of force according to two different techniques so as to validate the result of a detection, as in patent U.S. Pat. No. 6,940,240. Another solution described in patent U.S. Pat. No. 6,870,334 allows permanent updating of detection thresholds, but requires the presence of a genuine force sensor on the movable element.

The invention makes provision to remedy these drawbacks. It applies to all the devices cited, and mainly in the case where the brake is of differential type.

Document EP 1 530 284 describes a method for regulating the speed of a DC motor with no brake other than a short-circuit of the armature. In this method, the speed of the motor is detected permanently by measuring the voltage across its terminals and the motor is accelerated or it is braked as a function of a comparison between the voltage measured across the terminals of the motor and the voltage across the terminals of the power supply generator. The braking of the motor is obtained by short-circuiting the armature of the motor while the motor is no longer powered. Comparison of the voltage across the terminals of the armature of the motor and across the terminals of the generator therefore allows two modes of power supply of the motor depending on whether it is operating in motor mode or it is operating in generator mode. But the actual operation in generator mode of the motor does not correspond to driving-load operation except in the ideal case where there are no power losses, in particular in a reduction gear. Stated otherwise, this method of speed regulation leads to a regulated speed substantially greater than the no-load speed.

Document FR 2 898 994 describes a method of obstacle detection taking account of the nature of the obstacle. In this method, the torque limit value not to be exceeded can depend on the position of the screen.

Document FR 2 849 300 describes a method for measuring the torque of an asynchronous motor on the basis of the voltage of the phase-shift capacitor.

SUMMARY OF THE INVENTION

The aim of the invention is to provide a method for analyzing the operating state of an actuator obviating the drawbacks cited above and improving the operating methods known from the prior art. In particular, the invention proposes a simple method for determining whether a load linked to an actuator is driven or driving. The invention furthermore proposes a method of operating an actuator implementing such an analysis method.

The invention also proposes a learning method for an actuator implementing such an analysis method, and an actuator implementing one of the methods.

The operating method according to the invention is defined by claim 1.

Various modes of execution of the operating method according to the invention are defined by claims 2 to 9.

According to the invention, a learning method is defined by claims 10 and 12.

According to the invention, an electromechanical actuator is defined by claim 11.

BRIEF DESCRIPTION OF THE DRAWING

The appended drawing represents, by way of example, an embodiment of an analysis method according to the invention and an actuator device making it possible to implement such an analysis method.

DESCRIPTION OF THE PREFERRED EMBODIMENTS

Figure 1:
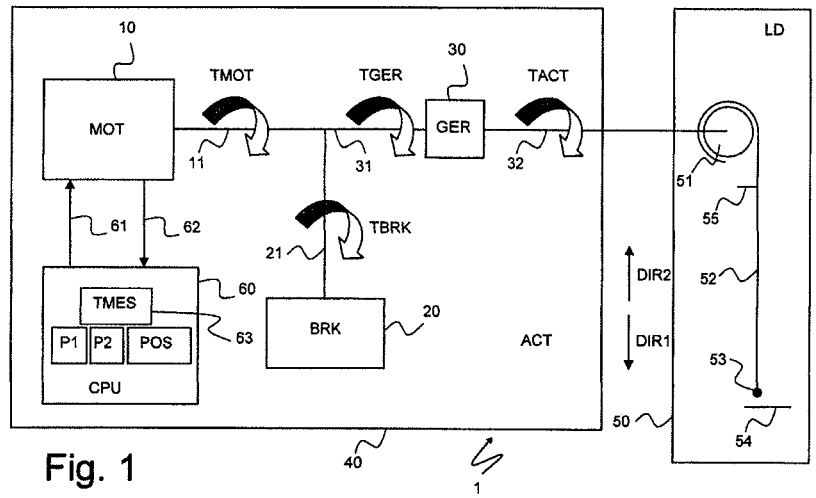
FIG. 1 is a diagram of an embodiment of an actuator allowing the execution of an analysis method according to the invention.

FIG. 1 schematically represents an installation 1 comprising an actuator according to the invention.

The actuator 40 is denoted by ACT. It comprises a motor 10, in particular an induction motor or a motor of brushless type, denoted by MOT, coupled mechanically to a differential brake 20 denoted by BRK and to a reduction gear 30 denoted by GER.

The output shaft of the reduction gear GER constitutes the mechanical output of the actuator and drives a movable element in an equipment 50, denoted by LD. In the installation of FIG. 1, this movable element is windable on a tube 51 driven in rotation by the mechanical output 32 of the actuator and comprises a shutter panel 52, a first end of which is attached to the tube while a second end 53 is ballasted and guided by runners, not represented.

A first direction of rotation of the motor causes the vertical movement of the shutter panel in the first direction DIR1: the load is mainly "driving" in relation to the actuator. A second direction of rotation of the motor causes the vertical movement of the shutter panel in the second direction DIR2: the load is then "driven" in relation to the actuator. The movement in driving-load mode can be interrupted by arrival at a first mechanical stop 54. The movement in driven-load mode can be interrupted by arrival at a second mechanical stop 55.

By taking a convention of definitions for "driven load", the torque provided by the motor on the motor output shaft 11 is denoted by TMOT, the braking torque produced by the brake in opposition to the motor torque is denoted by TBRK, this torque being measured on a revolving plate 21 movable in rotation, the torque provided on the reduction gear input shaft 31 is denoted by TGER, this torque resulting from the antagonistic actions of the motor and of the brake, and the torque provided on the reduction gear output shaft 32 is denoted by TACT, which constitutes the torque for driving the load LD.

The actuator ACT also comprises in a control block 60, denoted by CPU, means for receiving movement commands, control means acting on the power supply 61 of the motor. The electrical parameters of the motor 62 are transmitted to torque estimation or measurement means 63, referenced TMES, making it possible to analyze the motor torque variations and to act on the control of the motor. Alternatively, the measurement means analyze speed variations. The control block comprises, in particular, software means for governing the operation of the actuator. It comprises, in particular, software means for allowing operation of the actuator according to the methods which are the subject of the invention. In particular, these software means comprise computer programs.

The software means allow in particular the actuator to react differently according to the value of one or more parameters: for example, the actuator can exhibit a first manner of operation governed by a first software module when the load to which it is tied is driven and can exhibit a second manner of operation governed by a second software module when the load to which it is tied is driving. These two manners of operation relate in particular to a first process P1 (or first determination logic) for detecting an end of travel or an obstacle P1 or a second process P2 (or second determination logic) for detecting an end of travel or an obstacle. The first or the second manner of operation can also relate to other operating parameters of the actuator, for example an electrical limitation of the power of the actuator if the load is detected as driving. The actuator therefore comprises hardware and software means able to implement the various steps of the methods which are the subject of the invention and in particular the various steps defined by claims 1 to 10. One determination logic can differ from the other simply by a parameter value, for example a detection threshold value.

Figure 2:
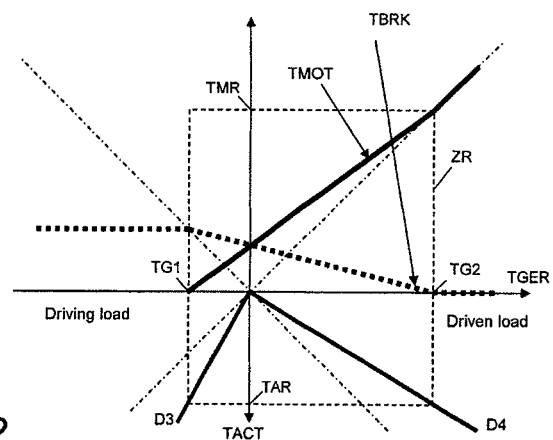
FIG. 2 is a diagram representing the evolution of various torques in an actuator as a function of the torque at the input of the reduction gear of this actuator.

The two upper quadrants of FIG. 2 represent, to one and the same scale, the motor torque TMOT and the torque produced by the brake TBRK as a function of the torque provided on the reduction gear input shaft TGER. This figure corresponds to an optimized dimensioning, making it possible to have as high as possible a slope (when no account is taken of the safety margins) for the motor torque in the actuator's normal operating zone ZR, delimited by a dashed-line rectangle.

The right quadrant corresponds to driven-load operation, while the left quadrant corresponds to driving-load operation.

In the lower quadrants of FIG. 2 are also represented the torque characteristics of the actuator as a function of the reduction gear torque, to one and the same scale (including the reduction ratio). The values 0.65 and 0.55 have been taken as respective values of the forward efficiency of the reduction gear EGERd and of the reverse efficiency of the reduction gear EGERi.

The straight line D3, in bold, therefore represents the relation:

$$TGER = EGERi \times TACT,$$

the load is driving the reduction gear, while the straight line D4, in bold, represents the relation:

$$TACT = EGERd \times TGER,$$

when the reduction gear is driving the load.

The specification of the actuator appears in a simple manner in the figure: the rated torque of the actuator TAR is firstly plotted and from this are deduced, on the basis of the intersections with the straight lines D3 and D4 the values of the rated reduction gear torque in driven-load mode TG2 or driving-load mode TG1, as well as the rated value TMR of the motor torque in driven-load mode. The normal operating zone ZR lies within the rectangle defined by these values.

It is clear that one and the same variation in output torque of the actuator is seen by the reduction gear input:

multiplied by the reverse efficiency EGERi, in a driving-load situation, divided by the forward efficiency EGERd, in a driven-load situation, and therefore causes two respective values of motor torque variation which are themselves in a ratio equal to the product EGERd×EGERi, (in our example equal to 0.65×0.55=0.36) in the case of a brake deactivated by the stator magnetic flux or of an electro-brake. In the case of a differential brake, this value is all the more closely approached when the smaller is the torque TG2 compared with the torque TG1.

For one and the same variation of the output torque of the actuator, the motor therefore sees torque variations that are almost three times as low in driving-load mode as in driven-load mode. This results in fine detection of an obstacle being impossible if the state of the load is not analyzed.

Figure 3:
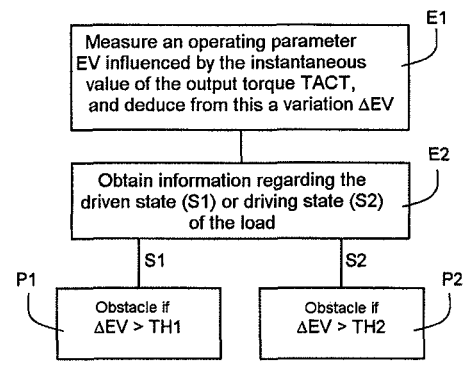
FIG. 3 is a flowchart of a method of operating an actuator according to the invention.

FIG. 3 represents the detection method according to the invention.

In a first step E1, a variable operating parameter EV, influenced by the instantaneous value of the output torque of the actuator TACT, is measured. This parameter EV is the torque of the motor or preferably a quantity proportional to the motor torque (for example the strength of the stator current when dealing with a DC motor) or a quantity varying in a known manner with the motor torque (for example the voltage across the terminals of the phase-shift capacitor when dealing with a monophase induction motor).

Alternatively, the operating parameter EV is the speed of the rotor.

Alternatively, if the motor is of electronic commutation type (ECM), for example of brushless type (BLDC), the operating parameter EV is the mean current absorbed by the power supply circuit of the motor (for example a three-phase inverter), or else a variable quantity of this circuit, for example a phase angle relating to the turning on of transistors contained in this circuit.

In all cases, the operating parameter EV is transmitted to the control block CPU in the form of electrical parameters 62.

The process is iterated over time so as not only to measure the operating parameter EV but to calculate its variation ΔEV.

In a second step E2, according to the schemes detailed below, information regarding the state of the load is obtained: either the load is driven (state S1), or the load is driving (state S2).

Preferably, the operating parameter EV is used to obtain this information.

If the load is driven, then a first detection process P1 is activated. If the load is driving, then a second detection process P2 is activated.

The first detection process compares the measured variation ΔEV of the operating parameter with a first threshold TH1 and concludes that an obstacle is present if this threshold is exceeded.

The second detection process compares the measured variation ΔEV of the operating parameter with a second threshold TH2 and concludes that an obstacle is present if this threshold is exceeded. The second threshold is lower than the first threshold, preferably multiplied by the product of the forward and reverse efficiencies of the reduction gear.

For example, the second threshold is three times as low (or at least twice as low) as the first threshold.

Alternatively, the two processes use one and the same threshold TH, but the measurement device contains an amplification means exhibiting a first amplification A1 of the signal measured when the load is driven and a second amplification A2 of the signal measured when the load is driven, the second amplification being greater than the first and, preferably, in the previous ratio. For example, the second amplification is three times (or at least two times) greater than the first. There will be detection if: A1×ΔEV>TH, or if: A2×ΔEV>TH, depending on the detection process activated.

Alternatively, the processes are constructed with different subroutines to also take account of other features related to the nature of the movable element and/or of the actuator.

Alternatively the second step E2 precedes the first step E1, for example in the case where the information regarding the driven or driving state of the load is obtained by using the measurement of a quantity other than the operating parameter influenced by the instantaneous value of the output torque.

In the prior art, information regarding the state of the load is easily deduced from the sign of the stator current in the case of a DC motor with electro-brake: if the current is positive, then the load is driven, if the current is negative, then the load is driving. The information is then obtained directly without resorting to the invention.

On the other hand, one and the same DC motor fitted with a torque transmission brake (or differential brake) poses a problem since the motor current always has the same sign (no reversal of motor torque).

In the case of an asynchronous motor (or induction motor), the information regarding the state of the load is deduced from the speed of the rotor by comparing with the value of the no-load speed (close to the synchronism speed). Alternatively, the voltage across the terminals of the phase-shift capacitor is used, which is related to the speed.

Figure 4:
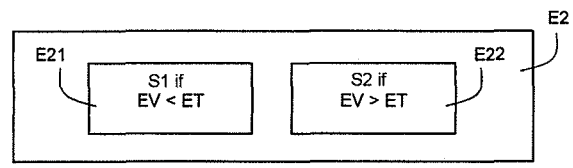
FIG. 4 is a detailed flowchart of an exemplary embodiment of step E2 of the operating method of FIG. 3.

In the case of a differential brake, of a partially irreversible reduction gear, and likewise with a monophase induction motor or with a brushless motor, it is therefore indispensable to resort to an estimation of the state of the load, based on comparing the operating parameter EV (current, speed, capacitor voltage) with a reference quantity (or threshold quantity) ET corresponding as close as possible to operation at zero load, as represented in FIG. 4. ET is for example the speed of the motor rotor when the load on the actuator is zero.

We have:

EV<ET: driven load, state S1

EV>ET: driving load, state S2.

Ideally, a trial suffices to record in a memory of the actuator the value of the reference quantity, which stored value is then denoted by ET0.

However, the reference quantity ET depends in particular on the brake temperature, on the wear of the linings, the spring acting on the plate, the power supply voltage, the losses in the reduction gear, etc. It must therefore be updated at least periodically, and if possible at the beginning of any new maneuver, or must be at least recalculated on the basis of the stored value ET0.

The operating parameter EV itself depends on all these parameters. It must therefore be compared not with the stored value ET0 but with a value ET updated as a function of the current temperature T, compared with that of the recording T0, and as a function of the current voltage U, compared with that of the recording U0. This update is calculated at least with a linear approximation:

$$ET = ET0 \times F1(T/T0) \times F2(U/U0) \times K. \quad (1)$$

F1 and F2 being analytical or tabulated functions deduced from trials.

K is a composite wear coefficient, integrating for example the wear of the spring, and that of the lining of the brake.

But, preferably, a trial close to the truly no-load trial makes it possible to update, just before the maneuver, the quantity ET serving as reference.

A first type of trial can consist in retreating a little from the top end of travel position FCH (1 to 2 seconds of movement) and in measuring EV in both directions (EVDN going down and then EVUP going up) and then calculate the mean to obtain ET. Indeed, for most movable elements, the effort to be provided is very small in the vicinity of the top position. If the top end of travel is characterized by a mechanical stop, one first retreats from this stop before carrying out the trial so as to be sure of not encountering it in the return movement.

This first type of trial can also be implemented in an intermediate position: the fact of taking the mean of the brief to-and-fro movement makes it possible to obtain a value close to what the operating parameter would be in a true no-load trial. Still better precision is obtained by weighting the measurements EVUP and EVDN by the efficiencies in the case where the operating parameter is at least substantially proportional to the torque.

Figure 5:
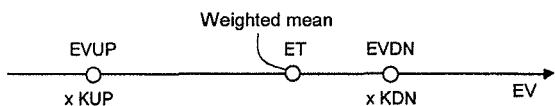
FIG. 5 is a basic diagram for determining a datum used in the analysis method according to the invention.

FIG. 5 gives an exemplary determination of the reference quantity ET when a brief to-and-fro movement is performed from an intermediate position. In the down movement, in driving load mode, an operating parameter (for example the speed of the rotor) equal to EVDN is measured. In the up movement, in driven load mode, an operating parameter equal to EVUP is measured. Now, everything happens as if the load had varied in the ratio of the product of the efficiencies (for example by a factor 3). If a first weighting coefficient KUP equal to 1 is assigned to the measurement EVUP, then a second weighting coefficient KDN equal to the inverse of the product EGERd×EGERi is assigned to the measurement EVDN, and the value of the reference quantity is the mean of the weighted measurements.

Alternatively, the trial is carried out in a single direction only: for example downward in the vicinity of the top end of travel.

A second type of trial consists in taking advantage of an existing clearance (for example during the destacking of openwork slats) (or indeed creating intentional clearance) in the bottom position FCB and in measuring EV as the upward movement begins: while overhauling the clearance, the load is zero or almost so.

Each time, the last value of the reference quantity ET is recorded as stored value ET0.

Thus, in the course of an arbitrary operating cycle, if the starting position does not make it possible to determine ET, for example because there is no clearance and the movable element was halted at mid-travel and because no brief to-and-fro movement is employed, then it suffices to apply equation (1) in which it is considered that K=1 (no appreciable wear since the last recording), and in which the values of F1 and F2 are read from tables. The voltage U is measured as such.

If the temperature T is not measured, it can however be deduced from the value taken by EV at the precise moment when the motor is switched on, or by other indirect means known to the person skilled in the art.

Figure 6:
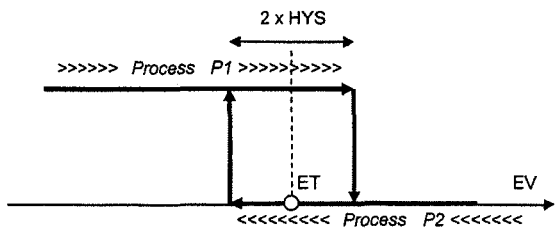
FIG. 6 is a diagram of a variant of an actuator operating method using the analysis method according to the invention.

For a better execution, the method according to the invention makes provision for an overlap range with hysteresis, as indicated in FIG. 6.

The second process is activated only when the operating parameter EV exceeds the value of the reference quantity ET by an amount equal to the hysteresis HYS, but remains active as long as we have not dropped back below this reference quantity again by an amount equal to the hysteresis. Conversely for the first process.

Alternatively, and preferably, the two processes are permanently activated, but it is the result of one or of the other which is taken into consideration depending on the information regarding the state of the load.

It should be noted that in the case where a driving load situation has been clearly identified, the second process P2 is implemented, which is more sensitive than the first process P1. Therefore, as soon as the load passes from driving to driven (passing of the actual threshold), the simple change of efficiency of the reduction gear suffices to conclude that an obstacle has been detected.

The overlap range is therefore entirely non-penalizing in this case.

Using the dual process described in the invention:

does not degrade the current detection on conditions of driven load, renders the detection of driving-driven switchover very effective, allows more accurate detection to be carried out under driving-load conditions.

The more accurate the estimation, the smaller the hysteresis range.

An additional advantage of the invention is to facilitate the automatic detection of the type of movable element driven by the actuator, since the point of switchover from driven load to driving load is an essential characteristic making it possible to distinguish two roller blinds or else a roller blind, a facade shutter, a terrace shutter etc.

The invention can finally be combined with the teachings of the prior art to vary the detection thresholds with the position, in a continuous manner or zone-wise.

The invention can also be used in a periodic manner only, in learning or maintenance cycles, to identify and record a position of change of state of the load, or several positions of change of state of the load along the trajectory, and periodically reupdate these change of state positions.

The invention can also be used in a first learning cycle to identify a direction of displacement of the movable element, hence to distinguish an up movement from a down movement and thus allow the automatic matching of a direction of rotation of the motor (Direction 1 or Direction 2) with a movement control command (Up or Down) dispatched to the actuator.

In this case, the various detection processes will be activated as a function of the indication of a position sensor, with respect to the change of state positions recorded. The recording of the positions in which the load is driving and of the positions in which the load is driven is carried out in a memory POS of the control block CPU.

The expression "differential brake" is understood to mean a brake acting automatically as soon as the load tends to drive the motor. Thus, there exists a torque that must be provided by the motor when the torque of the load due to the movable element is produced in the same direction as that of the motor. That is to say that, even when the torque created by the movable element on account of the gravitational forces tends to drive it in the direction of its displacement ordered by the motor, the operation of the motor is nevertheless of the "motor" type and not of the "generator" type. In some situations, this torque provided by the motor is substantially constant when the torque created by the movable element tends to drive the latter in the direction of its displacement ordered by the motor. An exemplary differential brake is a ramp brake comprising friction disks brought into contact with one another and possibly being separated from one another by an action of an input shaft on a helical ramp of one of the disks. Another exemplary differential brake is a spring-type brake as described in patent EP 0 976 909.

The invention claimed is:

1. A method of operating an actuator for maneuvering a movable element, comprising a motor of induction type or of brushless type or comprising a motor associated with a differential brake, and comprising a partially irreversible reduction gear, which comprises
   a step of establishing a measurement of an operating parameter of the actuator and
   a step of using this measurement to determine whether the actuator is driving the movable element or whether the actuator is being driven by the movable element, and
   then a step of implementing first logic for determining an end of travel or an obstacle, or a step of implementing second logic for determining an end of travel or an obstacle, depending on whether the actuator drives the movable element or the actuator is driven by the movable element,
   wherein the measured operating parameter is a variable operating parameter, influenced by the instantaneous value of the output torque of the actuator, and
   wherein, in the first logic for determining the ends of travel or an obstacle, an end of travel or an obstacle is detected by the exceeding of a fourth threshold value and in that, in the second logic for determining the ends of travel or an obstacle, an end of travel or an obstacle is detected by the exceeding of a fifth threshold value.

2. The operating method as claimed in claim 1, which comprises a preliminary step of determining a first threshold value of the parameter and in that the step of using the measurement comprises a comparison of the measurement with the first threshold value.

3. The operating method as claimed in claim 2, wherein the first threshold value is the value of the parameter when the actuator is operating in no-load mode.

4. The operating method as claimed in claim 2, wherein the preliminary determination step comprises a series of two maneuver movements of the movable element in two opposite directions, two measurements of the operating parameter, one in each of the directions of maneuver, and an establishment of the first threshold value on the basis of the two measurements.

5. The operating method as claimed in claim 4, wherein the step of establishing the first threshold value comprises a procedure for calculating a mean of the two measurements of the operating parameter.

6. The operating method as claimed in claim 1, wherein the parameter is the rotation speed of the motor or the power supply current of the motor or, in the case of an induction motor, the voltage of the phase-shift capacitor of the motor or, in the case of an electronic commutation motor, the mean current absorbed by the power supply circuit of the motor.

7. The operating method as claimed in claim 1, wherein the ratio of the fourth and fifth threshold values is at least substantially equal to the product of the forward and reverse efficiencies of the reduction gear of the actuator.

8. A learning method for an actuator for maneuvering a movable element, which comprises the implementation of the operating method as claimed in claim 1 in:
   a step of recording the positions in which the actuator drives the movable element and the positions in which the actuator is driven by the movable element, and/or
   a step of automatically detecting the type of movable element on the basis of a point of switchover from driven load to driving load, and/or
   a step of determining the direction of displacement of the movable element.

9. Learning method according to claim 8, wherein the step of determining the direction of displacement of the moveable element allows the automatic matching of a direction of rotation of the motor (Direction 1 or Direction 2) with a movement control command (Up or Down) -sent to the actuator.

10. An electromechanical actuator for maneuvering a movable element comprising hardware and software means for implementing a method as claimed in claim 1.

11. A method of operating an actuator for maneuvering a movable element, comprising a motor of induction type or of brushless type or comprising a motor associated with a differential brake, and comprising a partially irreversible reduction gear, which comprises
   a step of establishing a measurement of an operating parameter of the actuator and
   a step of using this measurement to determine whether the actuator is driving the movable element or whether the actuator is being driven by the movable element, and
   then a step of implementing first logic for determining an end of travel or an obstacle, or a step of implementing second logic for determining an end of travel or an obstacle, depending on whether the actuator drives the movable element or the actuator is driven by the movable element,
   wherein the measured operating parameter is a variable operating parameter, influenced by the instantaneous value of the output torque of the actuator,
   wherein a step of analyzing the operation of the actuator comprising:
   a preliminary phase of determining a second threshold value of an operating parameter of the actuator, and a preliminary phase of determining a third threshold value of the parameter, greater than the second threshold value, and in that the first logic for determining the ends of travel or an obstacle is implemented as soon as the value of the parameter becomes greater than the third threshold value and as long as it remains greater than the second value and the second logic for determining the ends of travel or an obstacle is implemented as soon as the value of the parameter becomes less than the second threshold value and as long as it remains less than the third value.

12. The operating method as claimed in claim 11, wherein the parameter is the rotation speed of the motor or the power supply current of the motor or, in the case of an induction motor, the voltage of the phase-shift capacitor of the motor or, in the case of an electronic commutation motor, the mean current absorbed by the power supply circuit of the motor.

13. A learning method for an actuator for maneuvering a movable element, which comprises the implementation of the operating method as claimed in claim 11 in:

a step of recording the positions in which the actuator drives the movable element and the positions in which the actuator is driven by the movable element, and/or a step of automatically detecting the type of movable element on the basis of a point of switchover from driven load to driving load, and/or a step of determining the direction of displacement of the movable element.

14. Learning method according to claim 13, wherein the step of determining the direction of displacement of the movable element allows the automatic matching of a direction of rotation of the motor (Direction 1 or Direction 2) with a movement control command (Up or Down) sent to the actuator.

15. An electromechanical actuator for maneuvering a movable element comprising hardware and software means for implementing a method as claimed in claim 11.

* * * * *